(12) United States Patent
Stanhope et al.

(10) Patent No.: US 7,175,761 B2
(45) Date of Patent: Feb. 13, 2007

(54) FLUID FILTER ASSEMBLY

(75) Inventors: Kris S. Stanhope, Browns, IL (US);
Ronald L. Kinkade, West Salem, IL (US); Kent C. Stanhope, Albion, IL (US); Larry Dean Michels, Olney, IL (US); John W. Stockhowe, Carmi, IL (US)

(73) Assignee: Champion Laboratories, Inc., Albion, IL (US)

( * ) Notice: Subject to any disclaimer, the term of this patent is extended or adjusted under 35 U.S.C. 154(b) by 400 days.

(21) Appl. No.: 10/715,682

(22) Filed: Nov. 18, 2003

(65) Prior Publication Data
US 2005/0103692 A1 May 19, 2005

(51) Int. Cl.
*B01D 35/147* (2006.01)
(52) U.S. Cl. .............. 210/130; 210/136; 210/420; 210/433.1; 210/443; 210/450
(58) Field of Classification Search ........ 210/130–133, 210/420, 433.1, 440, 443, 444, DIG. 17, 210/445, 450
See application file for complete search history.

(56) References Cited

U.S. PATENT DOCUMENTS

| 3,231,089 A | 1/1966 | Thornton |
| 3,262,565 A * | 7/1966 | Silverwater ................ 210/90 |
| 3,305,095 A | 2/1967 | Hathaway |
| 3,785,491 A | 1/1974 | Dudinec |
| 4,872,976 A | 10/1989 | Cudaback |
| 5,405,527 A | 4/1995 | Covington ................ 210/130 |
| 6,027,640 A * | 2/2000 | Covington et al. ......... 210/130 |
| 6,096,199 A * | 8/2000 | Covington ................ 210/130 |
| 6,136,183 A | 10/2000 | Suzuki |
| 6,284,130 B1 | 9/2001 | Daniel |
| 6,595,372 B1 | 7/2003 | Minowa et al. ............ 210/440 |
| 6,793,808 B2 * | 9/2004 | McKenzie ................ 210/130 |

* cited by examiner

*Primary Examiner*—Joseph Drodge
(74) *Attorney, Agent, or Firm*—Olson & Hierl, Ltd.

(57) ABSTRACT

A filter assembly has a housing open at one end, with an annular filter media/core assembly disposed in the housing. An end plate having at least two inlet openings and an outlet opening is disposed in the open end of the housing. The end plate is affixed to a lid which is secured to the end of the housing. A combination valve is retained between the filter media/core assembly and the end plate. The combination valve has a first portion that cooperates with the first inlet opening in the end plate and a second portion cooperating with the second inlet opening. In use fluid will pass through the first inlet opening, the filter media/core assembly and be discharged from the housing through the outlet opening. When the filter media begins to clog, pressure will build and upon attainment of a predetermined pressure the second portion will open the second inlet opening and fluid flow can pass through the second inlet opening to the outlet opening, for discharge from the filter assembly and return to the engine, thereby bypassing the filter media. A spring is disposed between the end of the filter media remote from the end plate and the housing for biasing the filter media/core assembly toward the end plate to retain the combination valve in place.

17 Claims, 4 Drawing Sheets

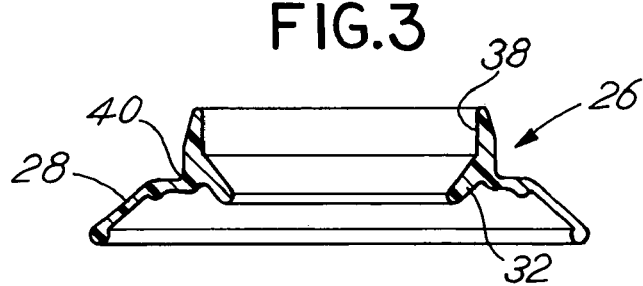
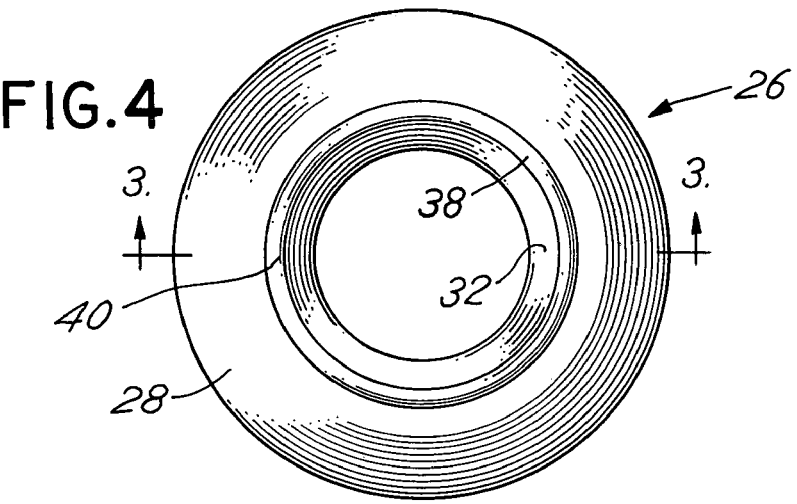
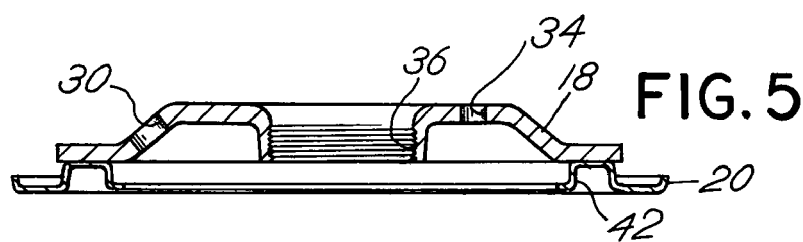
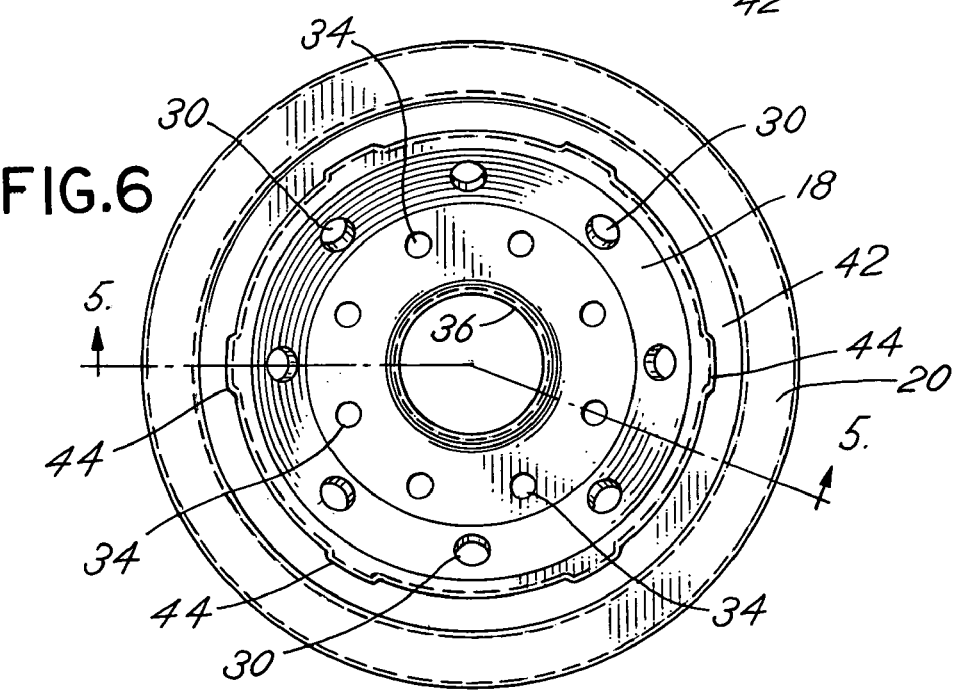

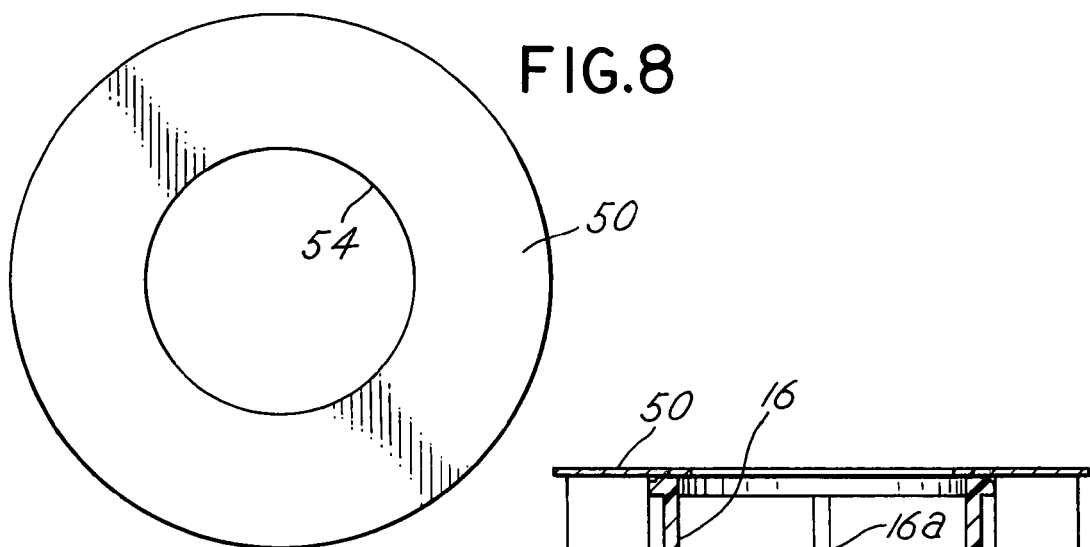
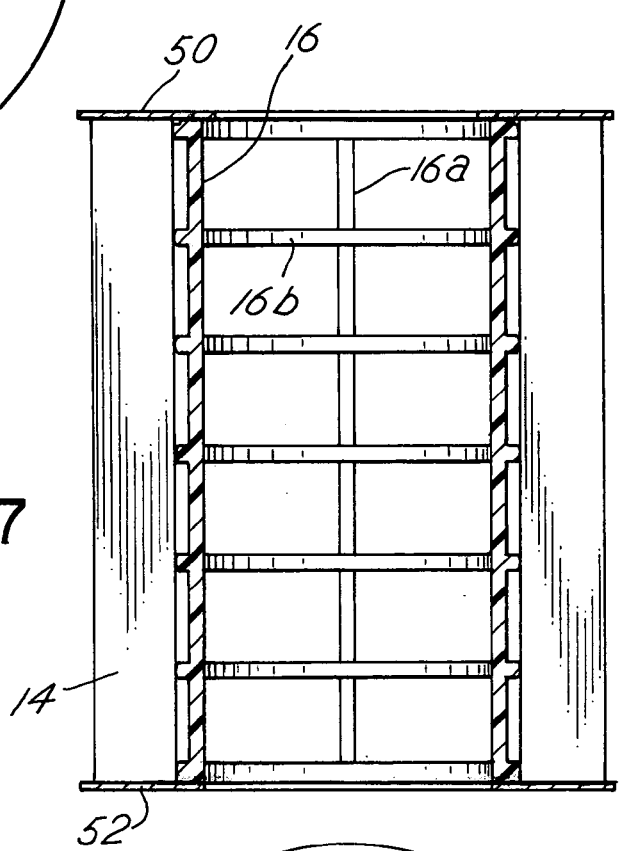
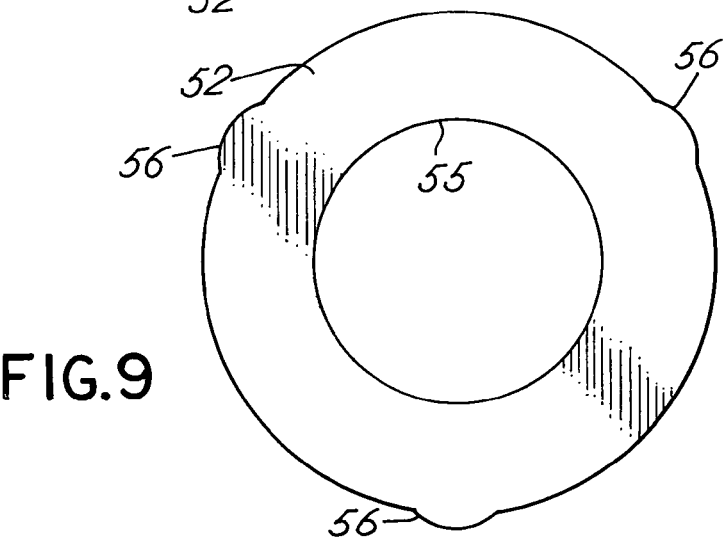

FLUID FILTER ASSEMBLY

BACKGROUND OF THE INVENTION

A. Field of the Invention

This invention pertains to a fluid filter assembly having a combination valve retained between a filter media/core assembly and an end plate and, more particularly, to a fluid filter assembly having a novel unitary combination check valve and bypass valve cooperating with a unique end plate for controlling the flow of fluid into and out from the fluid filter assembly. Further, the invention pertains to a fluid filter assembly that includes a filter means that cooperates with a novel combination valve and end plate and results in an overall design that can be more easily assembled.

B. Description of Related Art

There is known in the prior art a filter device having a housing with an open end, a filter element received in the housing, an end plate closing the open end and having inlet and outlet openings therein, and a valve for cooperating with the inlet openings to allow oil to flow into the filter through the inlet openings, but prevents flow of oil in a reverse direction. An example may be seen in Minowa et al. U.S. Pat. No. 6,595,372. Prior filters are known that include a combination valve having two portions, the first portion for closing the inlet openings to block the flow of oil back out of the inlet openings when the oil is not being circulated and the second portion for opening a bypass opening when the filter media is clogged for returning oil to the engine to keep the engine lubricated even though the filter element is clogged. An example of such construction is Covington U.S. Pat. No. 5,405,527.

The present invention improves upon the filter with combination valve, shown for example, in the Covington U.S. Pat. No. 5,405,527 and overcomes disadvantages and deficiencies of such prior art constructions.

C. SUMMARY OF THE INVENTION

An object of the present invention is to provide an improved filter assembly that has a simpler design and fewer parts than prior art filter assemblies.

Another object of the present invention is to provide an improved filter assembly that eliminates separate adhesives in fabricating the filter media and wherein internal element leakage is eliminated.

Yet another object of the present invention is to provide an improved filter assembly having a housing and a combination valve in the housing that better tolerates heavily contaminated oil and is retained in position against an end plate in the housing by the filter media under bias from an internal spring member between the top of the filter media and the interior of the housing of the filter assembly.

Another object of the present invention is to provide an improved filter assembly wherein parts are standardized for automated assembly and by increasing or decreasing the length of the filter media, and the housing, the capacity can be changed.

Other objects and advantages of the present invention will become more apparent hereinafter.

The invention pertains to a filter assembly having a housing open at one end, with an annular filter media/core assembly disposed in the housing. The end plate has at least two inlet openings and an outlet opening therein. A combination valve is disposed and retained between the filter media/core assembly and the end plate. The combination valve has a first portion cooperating with the first inlet opening in the end plate and a second portion cooperating with the second inlet opening. In normal operation the first portion of the combination valve will yield before the second portion of the combination valve and fluid flow will pass through the first inlet opening, the filter element and then be discharged through the outlet opening. When the filter element begins to clog, pressure upstream of the first portion will build and upon attainment of a predetermined pressure, the second portion will open the second inlet opening and fluid flow can pass through the second inlet opening and out the outlet opening, thereby bypassing the filter media/core assembly. A spring disposed between the end of the filter media/core assembly remote from the end plate and the housing biases the filter element toward the end plate to retain the combination valve in place and to seal fluid flow from between the combination valve and the filter media and between the combination valve and the end plate. The filter media/core assembly, which is fabricated from recyclable materials, includes top and bottom end caps which are suitably bonded to the filter media.

D. BRIEF DESCRIPTION OF THE DRAWING

There is shown in the attached drawing a presently preferred embodiment of the present invention wherein like numerals in the various views refer to like elements and wherein:

FIG. 3 is a cross-sectional view of the combination check and bypass valve taken generally along the line 3—3 of FIG. 4;

FIG. 4 is a top view of the combination check and bypass valve;

FIG. 5 is a cross-sectional view of the end plate and lid assembly taken generally along the line 5—5 of FIG. 6;

FIG. 6 is a bottom view of the end plate and lid assembly;

FIG. 7 is a longitudinal cross-sectional view of the filter media/core assembly;

FIG. 8 is a top view of the top end cap of the filter media/core assembly of FIG. 7;

FIG. 9 is a top view of the bottom end cap of the filter media/core assembly of FIG. 7;

E. DETAILED DESCRIPTION OF THE INVENTION

Figure 1:
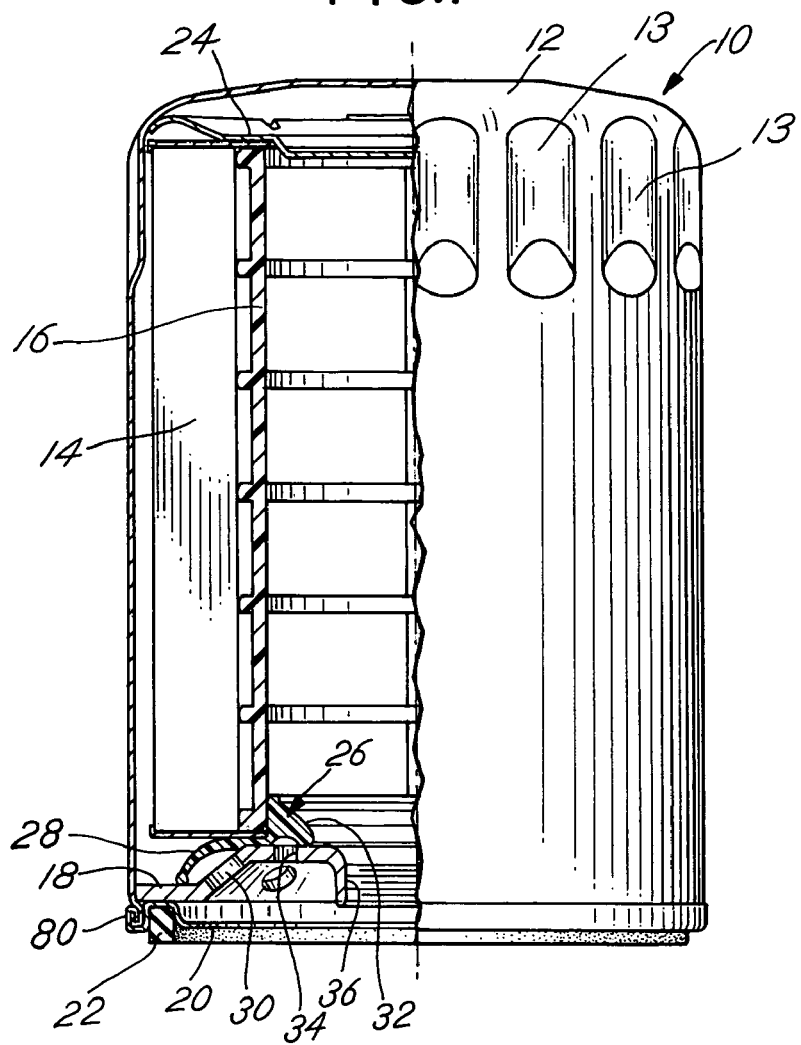
FIG. 1 is a side view of the filter assembly of the present invention, with part of the housing broken away to show interior parts including the combination check and bypass valve.
Figure 2:
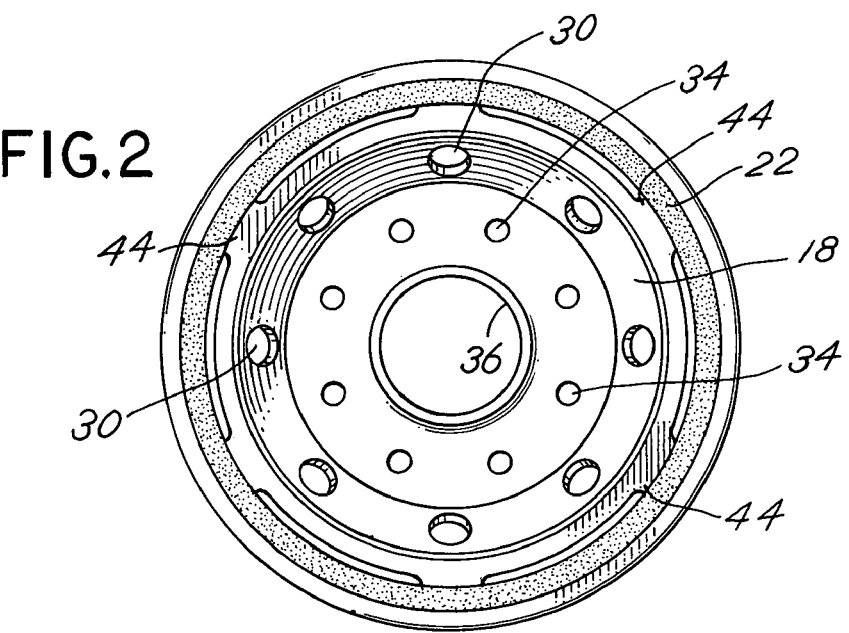
FIG. 2 is a bottom view of the filter assembly of FIG. 1.
Figure 10:
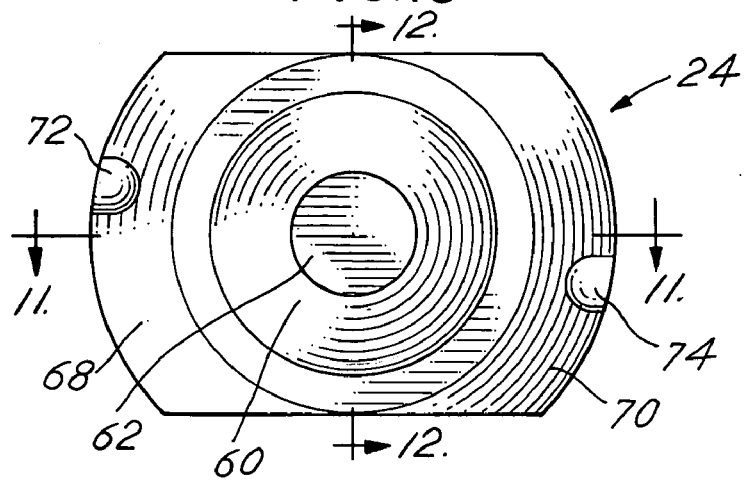
FIG. 10 is a plan view of the spring.
Figure 11:
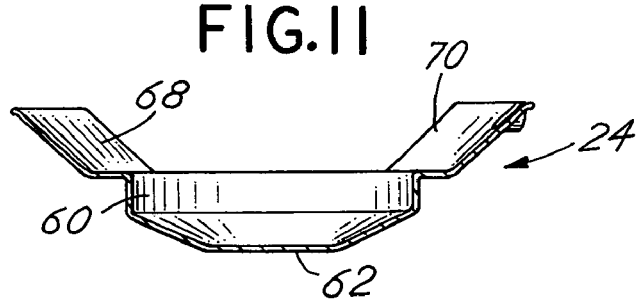
FIG. 11 is a sectional view of the spring taken generally along the line 11—11 of FIG. 10.
Figure 12:
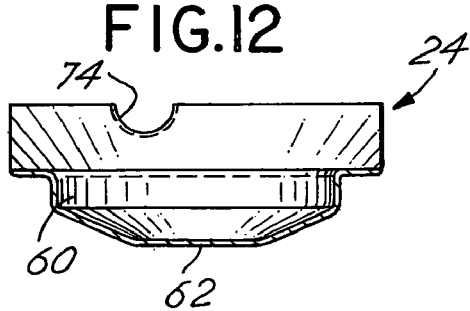
FIG. 12 is a detail sectional view of the spring taken generally along the line 12—12 of FIG. 10.
Figure 13:
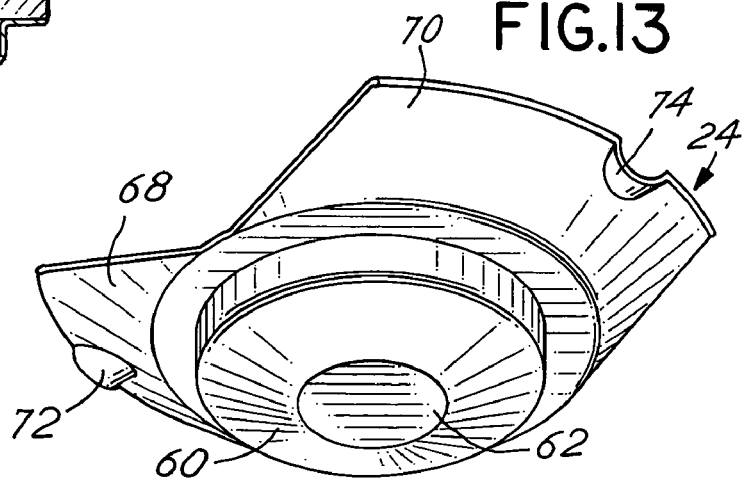
FIG. 13 is a perspective view of the spring.

There is shown in FIGS. 1 and 2 a filter assembly embodying the present invention. The filter assembly 10 includes a generally cup-shaped cylindrical shell or housing 12 that is open at one end and closed at the other. Disposed within the housing 10 is a filter means which comprises an annular filter element 14 mounted on a core 16. Provided in the open end of the housing 10 is an end plate 18, which has a lid 20 secured thereto. An annular, resilient gasket 22 is received and retained in a recess in the lid 20 for providing a seal between the filter assembly 10 and the engine block (not shown) to which the filter assembly 10 is secured in normal use. Recesses 13 are provide in the housing 12 proximate the top thereof for providing a better gripping surface for a wrench used to assemble a clean filter assembly to an engine block and to remove a dirty filter assembly from an engine block for replacement.

Resilient means 24, for example, a spring, is provided between the top of the filter element and the interior of the housing 12 for biasing the filter element 14 toward the end plate 18.

The combination valve 26, which is retained between the lower end of the filter element 14 and the top of the end plate 18 includes a first portion 28 for controlling flow through the first inlet opening or openings 30 and a second portion 32 for controlling flow through the second inlet opening or openings 34. The first portion 28 is more resilient than the second portion 30 and will open under a lesser pressure, whereas the second portion 32 is stiffer and requires a higher pressure to open same. In a presently preferred embodiment of the invention, the first portion 28 of the combination valve 26 will open the first inlet openings at a minimum opening pressure, for example, on the order of 1 psi and the second portion 32 will open the second inlet openings 34 at a predetermined higher pressure, for example on the order of 8–10 psi. Provided centrally in the end plate 18 is a central threaded outlet opening 36. As seen in FIG. 2, the outlet opening 36 is about the longitudinal axis of the filter assembly 10 and is within the circle of second openings 34. In a presently preferred embodiment of the invention as shown in FIG. 2, there are eight first inlet openings 30 and eight second inlet openings 34 in the end plate 18. Other opening configurations than round are feasible and the number of openings can be varied as will be apparent to persons skilled in the art, depending upon the application for the filter assembly 10.

The combination valve 26 of the present invention is better shown in FIGS. 3 and 4. The first portion 28 is annular and has a bend intermediate the radial extent of the first portion 28. As seen in FIG. 3, the part of the first portion 28 that engages the second portion 32 extends generally horizontally and the free end is inclined outwardly and downwardly from the horizontal portion. The second portion 32 includes an annular inwardly inclined part that is adapted to cooperate with the second inlet openings 34 and an upwardly extending part 38 that cooperates with the horizontal part of the first portion 28 to form a shoulder 40 that receives the lower inner end of the core 16 of the filter means. The part 38 is annular and engages the interior of the lower end of the core 16 of the filter means when assembled Turning to FIGS. 5 and 6, there is better shown the association of the end plate 18 and the lid 20 of the present invention. The end plate 18 is suitably secured to the lid 20, for example, by welding. The recess 42 in the lid 20 is adapted to receive and retain the gasket 22 (FIG. 1). The lid 20 is provided with projections 44 that slightly interfere with the recess 42, whereby in use, the gasket 22 is forced into the recess 42 and retained in place by the pressure from the projections 44 engaging and cooperating with the resilient gasket 22.

The resilient gasket 22 will be retained in the recess or groove 42 during handling of the filter assembly 10 and the projections 44 define cooperative engaging means for holding the gasket in place. Persons skilled in the art will understand that the gasket 22 can be similarly retained in place in the recess 42 if the projections 44 on the lid 20 were eliminated and projections were provided on the outside or inside surfaces of the gasket 22 for engaging with the walls of the recess 42. Such arrangement would function in an equivalent manner.

Openings 34 are disposed in a circle in the generally horizontal portion of the end plate 18 and have an axis that is generally parallel to the central longitudinal axis of the filter assembly 10. Openings 30 are disposed in a circle generally concentric to the circle for the openings 34 and spaced outwardly therefrom. The openings 30 are in the angled outward portion of the end plate 18 and the axis of each of the openings 30 is inclined with respect to the central longitudinal axis of the filter assembly 10.

FIGS. 7, 8, and 9 better disclose the filter media/core assembly or filter means of the present invention. The filter element 14 may be a conventional pleated filter media comprised, for example, of cellulose with some polyester. The core 16, which may be molded from an appropriate material, for example, a glass filled plastic, such as, Nylon, is perforated so as to permit fluid flow there through in use. Essentially, the core 16 comprises a cage formed by vertically disposed members 16a suitably secured to horizontally disposed members 16b. The filter media is formed from a sheet of pleated material joined along the facing ends by a suitable adhesive to form an annular sleeve on the cage 16. At the top and bottom are disposed end caps 50 and 52, respectively. The end caps 50 and 52 may be fabricated from a suitable composite material, for example a cellulose/polyester composite. Preferably, the end caps 50 and 52 are bonded to the filter media 14, for example, by ultrasonic welding, to form a seal between the ends of the filter media and the end caps to prevent fluid flow between these elements in use. Essentially the materials for the filter media 14, the core 16, and the end caps 50 and 52 are compatible for ultrasonic welding to fuse the parts to one another. This process eliminates the need for adhesive and the oven curing that was done in the past. The top end cap 50 is a generally annular plate that has an opening 54 in the center thereof. The bottom end cap 52 is a generally annular plate that has an opening 55 in the center thereof and projections 56 extending from the periphery thereof. As shown in FIG. 9 there are three projections 56 on the end cap 52. The projections 56 are adapted to abut the interior of the housing 12 to facilitate assembly of the filter means into the housing 12 and to properly position the lower portion of the filter means in the housing 12. The recesses 13 in the housing 12 will normally engage the top end cap 50 and help to properly position the upper end of the filter means in the housing 12.

FIGS. 10, 11, 12, and 13 pertain to the spring 24, which is disposed between the top of the filter element 14 and the interior of the housing 12. The spring 24 is imperforate and therefor closes the top opening 54 in the filter means, i.e., the opening 54 in the top end cap 50 of the filter means. The spring 24 includes a central imperforate dome-like portion 60 having a flattened bottom 62. The dome-like portion 60 will engage in the opening 54 in the top end cap 50 and close the opening 54 when the filter means is assembled in the housing 12. The spring 24 includes two spring arm portions 68 and 70 that extend from the dome-like portion 60 and engage with the interior of the housing 12 to apply a downward biasing force to the filter means. Recesses 72 and 74 are provided in the spring arm portions 68 and 70 to help strengthen the spring arm portions 68 and 70 in use and to prevent "shingling" during assembly, i.e, the springs are kept from intermingling one with another on a conveyor during the assembly process.

The assembly of the filter assembly 10 will now be described. The filter means is assembled with the annular filter media 14 on the core 16 and the end caps 50 and 52 secured in place. The end plate 18 and the lid 20 are secured together, for example, by welding, and the gasket 22 is positioned and retained in the recess 42 of the lid. The spring 24 is first inserted into the open end of the housing 12 until it seats against the closed end of the housing 12. The filter media is positioned in the housing abutting the spring 24. The recesses in the housing 12 will help to properly position the top of the filter means in the housing 12 and the projections on the lower end cap will help to position the lower end of the filter means in the housing 12. The combination valve 26 is positioned in the core 16 with the part 38 engaging the inner surface of the core 16 to help seal fluid flow between the combination valve 26 and the core 16 of the filter means. The end plate 18 is inserted to close the open end of the housing 12 and the outer rim of the lid 20 is rolled with the open end of the housing 12 to form a seal 80. Positioning of the end plate 18 in the housing 12 partially compresses the spring 24, whereby, when the parts are assembled a spring force is applied to the top of the filter means urging the filter means toward the end plate 18. The spring force will help to clamp the combination valve 26 between the filter means and the end plate 18 and to seal flow from between the filter means and the end plate 18. The core 16 will firmly engage the part 38 of the combination valve 26 and will also engage and bear upon the generally horizontal region of the first portion 28 of the combination valve 26.

In operation, the filter assembly 10 is spun onto a stud on the engine block which engages the threads in the central opening 36 in the end plate 18 and is secured in place. The gasket 22 will engage the engine block and preclude fluid flow from between the engine block and the filter assembly 10. When the engine is started, fluid, usually oil, will enter the filter assembly through the openings 30. Slight pressure will move the first portion or check valve portion 28 of the combination valve 26 away from the openings 30 and oil will flow through openings 30, the filter media 14 and be discharged through the cental outlet opening 36 for return to the engine. When the engine is turned off, the first portion or check valve portion 28 of the combination valve 26 will close the openings 30 and prevent return of oil in the filter assembly 10 to the engine. As the filter media 14 clogs during normal operation, pressure will build within the housing 12 of the filter assembly 10 and upon attainment of a predetermined pressure, on the order of 8–10 psi for one present application, the second portion or bypass portion 32 of the combination valve 26 will open and permit oil to flow through the openings 34 and back to the engine, thereby bypassing the filter media 14. Stated somewhat differently, during periods of time when high differential pressure exists across the filter media, due to cold thick oil or high contaminant loading of the filter media, the oil will go through the inner circle of openings 34 and open the second portion 32 of the combination valve 26 to permit oil to bypass the filter media 14 and exit the filter assembly 10 through the outlet opening 36 for return to the engine.

The present invention materially reduces the number of parts needed for a line of filters. Presently standard automotive filter assemblies are grouped into multiple filter diameters. A main line of filter assemblies heretofore consisted of multiple core diameters and multiple core heights. With the present invention, filter sizes can be consolidated and the complexity of internal components can be reduced significantly, for example to one core diameter and two core heights. Fabrication and assembly of the filter assemblies are simplified and can easily be automated. The filter media, core and end caps are non-metallic and can be easily recycled. The unique end cap design and orientation of the openings therein is a facilitating factor in both construction and operation of the filter assembly. The construction of the combination check valve and bypass valve and the cooperation of the combination check valve and bypass valve with the end plate contribute to easier assembly and enhanced performance. The respective circles of openings in the end plate are fairly close to one another. The combination valve is constructed so that it can be retained in place against the end plate by the core 16 of the filter means by contact between the two circles of openings. This arrangement seals fluid flow through one circle of openings from the fluid flow through the other circle of openings. Tolerances need not be tight to obtain the sealing results desired.

While a presently preferred embodiment of the present invention has been shown and described, it will be apparent to persons skilled in the art that the invention may be otherwise embodied within the scope of the following claims.

We claim:

1. A filter assembly having a housing open at one end, an annular filter media/core assembly disposed in said housing, an end plate secured to the housing and closing the open end thereof, the end plate having first inlet opening means, second inlet opening means and outlet opening means, a combination valve disposed between the annular filter media/core assembly and the end plate for controlling fluid flow through the first inlet opening means and the second inlet opening means, the combination valve being annular and including a first portion cooperating with the first inlet opening means and a second portion cooperating with the second inlet opening means, the second portion having more resistance to fluid flow than the first portion, whereby, the combination valve is configured such that when there is no fluid flow the first portion prevents fluid flow through the first opening means from within the housing, and in operation, the first portion will yield prior to the second portion and fluid flow will pass through the first opening means, the annular filter media/core assembly and then be discharged through said outlet opening means and when the annular filter media/core assembly begins to clog, pressure upstream of the first portion will build and upon attainment of a predetermined pressure, the second portion will open the second inlet opening means and fluid flow can pass through the second inlet opening means and out the outlet opening means bypassing the annular filter media/core assembly.

2. A filter assembly as in claim 1 including a spring disposed between the top of the annular filter media/core assembly and the inside of the housing for biasing the annular filter media/core assembly toward the end plate to retain the combination valve in place.

3. A filter assembly as in claim 1 wherein the combination valve comprises an annular member, with the first portion extending outwardly from a central portion and the second portion extending inwardly from the central portion, the second portion being stiffer than the first portion; the annular filter element engaging the central portion of the combination valve between the first portion and the second portion to retain the combination valve in place.

4. A filter assembly as in claim 3 wherein the annular filter media/core assembly includes a central core surrounded by filter media and the lower end of the central core engages the central portion of the combination valve.

5. A filter assembly as in claim 1 wherein the end plate has an inclined surface inclined with respect to the longitudinal axis of the housing and a transverse surface transverse to the longitudinal axis of the housing, the first inlet opening means being disposed in the inclined surface and the second inlet opening means being disposed in the transverse surface.

6. A filter assembly as in claim 1 wherein the first inlet opening means comprises a plurality of openings.

7. A filter assembly as in claim 1 wherein the second inlet opening means comprises a plurality of openings.

8. A filter assembly as in claim 1, wherein the first and second inlet opening means each comprised a pluralite of openings arranged generally in a circle around the axis of the filter assembly, the circle of openings for the first inlet opening means being substantially concentric to the circle of openings for the second inlet opening means, with the annular filter/media core assembly urging the combination valve against the end plate in the region between the two circle of openings.

9. A filter assembly as in claim 1, wherein the annular filter media/core assembly comprises a central core, a filter media surrounding the central core and end caps at the ends of the filter media, the filter media and end caps being fabricated from materials that can be bonded to fuse the components to one another and preclude any significant fluid flow therebetween.

10. A filter assembly as in claim 9, wherein the filter media and the end caps are ultrasonically welded to one another.

11. A filter assembly as in claim 9 wherein the second portion has a surface engaging the end plate and a surface engaging the central core.

12. A filter assembly as in claim 1 including a lid secured to the end plate, the lid having an outwardly extending recess for receiving a gasket.

13. A filter assembly as in claim 12 including complementary retaining means between the gasket and the sides of the recess for retaining the gasket in the recess.

14. A filter assembly as in claim 13 wherein the complementary retaining means include projections on either the gasket or a wall of the recess, wherein when the gasket is inserted into the recess, it will be retained therein.

15. In a filter assembly having a housing opening at one end, an annular filter media/core assembly disposed in said housing, and an end plate secured to the housing and closing the end plate having first inlet openings, second inlet openings and an outlet opening the open end thereof, the improvement comprising a combination valve disposed between the annular filter media/core assembly and the end plate for controlling fluid flow through the first and second inlet openings, the combination valve being annular and including a first portion cooperating with the first inlet openings and a second portion connected to the first portion and cooperating With the second inlet openings, the second portion having more resistance to fluid flow than the first portion, whereby, the combination valve is confleured such that when there is no fluid flow, the first portion prevents flow through through the first inlet openings from within the housing, and, in operation, the first portion will yield in response to minimum pressure and fluid flow will pass through the first inlet openings, the annular filter media/core assembly and then be discharged through the outlet opening and when the annular filter media/core assembly begins to clog, pressure will begin to build and upon attainment of a higher predetermined predsure, the second portion will open the second inlet openings and fluid flow can pass through the second inlet openings and out the outlet opening, bypassing the annular filter media/core assembly.

16. A filter assembly as in claim 15 wherein the combination valve comprises an annular member, with the first portion extending outwardly from a central portion and the second portion extending inwardley from the central portion, the second portion being stiffer than the first portion; the annular filter element engaging the central portion of the combination valve between the first portion and the second portion to retain the combination valve in place.

17. A filter aseembly as in claim 16 including a spring disposed between the top of the annular filter media/core assembly and the inside of the housing for biasing the annular filter media/core assembly toward the end plate to retain the combination valve in place.

* * * * *

UNITED STATES PATENT AND TRADEMARK OFFICE
CERTIFICATE OF CORRECTION

PATENT NO. : 7,175,761 B2
APPLICATION NO. : 10/715682
DATED : February 13, 2007
INVENTOR(S) : Kris S. Stanhope et al.

It is certified that error appears in the above-identified patent and that said Letters Patent is hereby corrected as shown below:

col. 7, line 10, change "puralite" to -- plurality --.
col. 8, line 10, change "With" to -- with --.
col. 8, line 12, change "confluered" to -- configured --.
col. 8, line 21, change "predsure" to -- pressure --.
col. 8, line 28, change "inwardley" to -- inwardly --.

Signed and Sealed this

Fifteenth Day of April, 2008

JON W. DUDAS
*Director of the United States Patent and Trademark Office*